UNITED STATES PATENT OFFICE.

ANDREW PATTERSON, OF WORCESTER, MASSACHUSETTS.

PROCESS OF MANUFACTURING PAPER-PULP FROM WORN-OUT CORSETS, &c.

SPECIFICATION forming part of Letters Patent No. 266,383, dated October 24, 1882.

Application filed September 20, 1882. (No specimens.)

*To all whom it may concern:*

Be it known that I, ANDREW PATTERSON, a citizen of the United States, residing at Worcester, in the county of Worcester and State of Massachusetts, have invented certain new and useful Improvements in Processes of Making Paper-Pulp from Worn-Out Corsets, &c.; and I do declare the following to be a full, clear, and exact description of the invention. such as will enable others skilled in the art to which it appertains to make and use the same.

This invention relates to an improved process of removing bones or horn braces from pieces of waste textile material, produced by mangling worn-out corsets, to prepare said pieces of material or corset for conversion into paper-pulp; and it consists in the hereinafter-described treatment of the same.

In carrying out my invention I proceed as follows: The waste or worn-out corset is subjected to a mangling process by being cut up into small pieces. These pieces are then placed in an alkaline solution, preferably of caustic soda as the best for the purpose, though any such solution will answer, the one named doing the work quicker. Preferably the pieces of waste corset, with the adhering pieces of bone or horn, and the alkaline solution are put into a rotary wash-boiler and exposed to steam-pressure or a boiling operation. This operation dissolves the bones or horn, and thus permits them to be readily washed, to which operation the mass is afterward subjected. No definite time is specified as to how long said operation of exposing the waste material or corset to the action of the said solution is to continue, as no harm will come to the fibers of the material or rags by the action of this solution, whether they remain under treatment a greater or less length of time, care being taken to properly gage the strength of the solution. The recipe for this purpose is half an ounce caustic soda to one pound of the rags in sufficient water to cover them. After the rags have remained in the alkaline bath a sufficient length of time, they are washed in water to remove the dissolved horn and bone.

Heretofore in the treatment of similar material or mangled waste corsets it has been common to place it in a machine and tear it in pieces and "whip" out the pieces of bone or horn, or to cut in pieces the corset and remove the pieces of bone or horn by hand. These methods are open to great objections. In the first, fine pieces of the bone or horn are liable to be left in the rags and be incorporated in the pulp upon the conversion of the rags into the latter, and when the pulp is made into paper the paper will have dark specks appearing on its surface. In the last-named process the work of removing the bones and horn from the cloth is a long, tedious, and therefore expensive operation. All of these difficulties are avoided by my process, while in addition thereto facility of operation is secured and greatly-improved results are obtained as to the quality of pulp and paper—desiderata sought in this class of manufacture.

I claim and desire to secure by Letters Patent—

1. The described process of removing bones or horn from waste textile material or corsets, which consists in mangling or reducing the same to small pieces and exposing them to the action of a boiling alkaline solution, as set forth.

2. The described process of removing bones or horn from waste textile material or corsets, which consists in reducing them to small pieces, saturating them in boiling alkaline solution, and finally washing the rags, as set forth.

3. The described process of removing the bones or horn from waste textile material or corsets, which consists in reducing the same to small pieces, exposing them to the action of a boiling solution of caustic soda, and then washing the rags, as set forth.

In testimony whereof I affix my signature in presence of two witnesses.

ANDREW PATTERSON.

Witnesses:
WILLIAM W. MACOMBER,
EDWIN ELDRED.